United States Patent
Takaoka et al.

(10) Patent No.: US 11,598,073 B2
(45) Date of Patent: Mar. 7, 2023

(54) CONTROL SYSTEM FOR WORK VEHICLE, METHOD, AND WORK VEHICLE

(71) Applicant: KOMATSU LTD., Tokyo (JP)

(72) Inventors: Yukihisa Takaoka, Tokyo (JP); Kazuki Kure, Tokyo (JP)

(73) Assignee: KOMATSU LTD., Tokyo (JP)

(*) Notice: Subject to any disclaimer, the term of this patent is extended or adjusted under 35 U.S.C. 154(b) by 337 days.

(21) Appl. No.: 16/644,007

(22) PCT Filed: Feb. 19, 2019

(86) PCT No.: PCT/JP2019/006036
§ 371 (c)(1),
(2) Date: Mar. 3, 2020

(87) PCT Pub. No.: WO2019/187792
PCT Pub. Date: Oct. 3, 2019

(65) Prior Publication Data
US 2021/0002870 A1  Jan. 7, 2021

(30) Foreign Application Priority Data
Mar. 29, 2018  (JP) .............................. JP2018-065142

(51) Int. Cl.
*E02F 9/26* (2006.01)
*G05D 1/00* (2006.01)
*E02F 3/84* (2006.01)

(52) U.S. Cl.
CPC .......... *E02F 9/265* (2013.01); *G05D 1/0094* (2013.01); *E02F 3/844* (2013.01); *G05D 2201/0202* (2013.01)

(58) Field of Classification Search
CPC . E02F 9/2045; E02F 9/24; E02F 9/261; E02F 9/262; E02F 3/76; E02F 3/84; E02F 3/841; E02F 3/844
See application file for complete search history.

(56) References Cited

U.S. PATENT DOCUMENTS

| | | | |
|---|---|---|---|
| 5,935,192 A | * | 8/1999 | Henderson .............. E02F 3/841 701/50 |
| 6,088,644 A | | 7/2000 | Brandt et al. |

(Continued)

FOREIGN PATENT DOCUMENTS

| | | |
|---|---|---|
| JP | 11-247230 A | 9/1999 |
| JP | 2009-209681 A | 9/2009 |

(Continued)

OTHER PUBLICATIONS

Examination report No. 1 for the corresponding Australian application No. 2019246095, dated Feb. 24, 2021.

(Continued)

*Primary Examiner* — Russell Frejd
*Assistant Examiner* — Sara J Lewandroski
(74) *Attorney, Agent, or Firm* — Global IP Counselors, LLP

(57) ABSTRACT

A work vehicle includes a work implement. A control system for the work vehicle includes a controller. The controller acquires work range data indicative of a work range. The controller determines a division distance by dividing an entire length of the work range by a predetermined number of divisions. The controller determines a plurality of starting positions so that the distance between each starting position matches the division distance in the work range. The controller generates an instruction signal to actuate the work implement from the plurality of starting positions.

12 Claims, 14 Drawing Sheets

(56) References Cited

U.S. PATENT DOCUMENTS

| | | | |
|---|---|---|---|
| 6,108,949 A | 8/2000 | Singh et al. | |
| 9,014,922 B2 | 4/2015 | Edara et al. | |
| 9,256,227 B1* | 2/2016 | Wei | E02F 9/261 |
| 9,297,147 B1* | 3/2016 | Wei | E02F 9/2045 |
| 9,783,955 B1* | 10/2017 | Clar | G05D 1/0219 |
| 2014/0174770 A1* | 6/2014 | Wei | E02F 3/841 |
| | | | 701/27 |
| 2015/0066352 A1* | 3/2015 | Sugihara | E21C 41/00 |
| | | | 701/408 |
| 2015/0276468 A1* | 10/2015 | Jaeger | G01G 9/00 |
| | | | 382/154 |
| 2015/0354169 A1* | 12/2015 | Wei | G05D 1/0251 |
| | | | 701/50 |
| 2016/0040397 A1* | 2/2016 | Kontz | G05B 13/04 |
| | | | 701/400 |
| 2016/0217690 A1* | 7/2016 | Yamasaki | H04L 67/12 |
| 2018/0341268 A1* | 11/2018 | Taylor | E02F 3/7604 |
| 2019/0078297 A1 | 3/2019 | Ishibashi et al. | |
| 2020/0277753 A1* | 9/2020 | Roh | E02F 9/264 |
| 2020/0362536 A1* | 11/2020 | Shimamura | E02F 9/2062 |

FOREIGN PATENT DOCUMENTS

| | | |
|---|---|---|
| JP | 2014-119349 A | 6/2014 |
| JP | 2016-8484 A | 1/2016 |
| JP | 2016-132912 A | 7/2016 |
| JP | 2017-14836 A | 1/2017 |
| JP | 2018-16974 A | 2/2018 |

OTHER PUBLICATIONS

The International Search Report for the corresponding international application No. PCT/JP2019/006036, dated May 21, 2019.

* cited by examiner

| ENTIRE WORK RANGE [m] | NUMBER OF DIVISIONS |
|---|---|
| 0−25 | 2 |
| 25−75 | 5 |
| 75−125 | 10 |
| 125−175 | 20 |
| 175−225 | 30 |
| ⋮ | ⋮ |

FIG. 7

| TOTAL SOIL AMOUNT [m$^3$] | NUMBER OF DIVISIONS |
|---|---|
| 60 | 2 |
| 150 | 5 |
| 300 | 10 |
| 600 | 20 |
| 900 | 30 |
| ⋮ | ⋮ |

FIG. 10

CONTROL SYSTEM FOR WORK VEHICLE, METHOD, AND WORK VEHICLE

CROSS-REFERENCE TO RELATED APPLICATIONS

This application is a U.S. National stage application of International Application No. PCT/JP2019/006036, filed on Feb. 19, 2019. This U.S. National stage application claims priority under 35 U.S.C. § 119(a) to Japanese Patent Application No. 2018-065142, filed in Japan on Mar. 29, 2018, the entire contents of which are hereby incorporated herein by reference.

BACKGROUND

Field of the Invention

The present invention relates to a control system for a work vehicle, a method, and a work vehicle.

Background Information

A system for automatically controlling a work vehicle has been conventionally proposed for work vehicles such as bulldozers, graders, and the like. For example, in the system of U.S. Pat. No. 9,014,922, a controller sets in advance a target profile that a work implement should perform at a work site from the topography and the like of the work site. The controller determines cut locations on the actual topography of the work site. The controller actuates the work implement so as to start excavating from the determined cut locations while following the target profile. The controller detects the load received by the work vehicle and adjusts the positions of the cut locations in response to the size of the load.

SUMMARY

The inventor of the present invention has proposed setting a working range of the work implement at a work site and determining a plurality of starting positions within the work range. In this case, when starting positions are determined in response to the size of the load received by the work vehicle as described above, there is a possibility that a very small amount of the soil remains on the topography to be excavated when performing the excavation from the final starting position within the work range. In this case, there is a problem that work efficiency declines.

An object of the present invention is to suppress a decline in the work efficiency in an automatic control of a work vehicle.

A first aspect is a control system for a work vehicle including a work implement, the control system comprising a controller. The controller is programmed so as to execute the following processing. The controller acquires work range data which indicates a work range. The controller determines a division distance by dividing the entire length of the work range by a predetermined number of divisions. The controller determines a plurality of starting positions so that the distance between each starting position matches the division distance in the work range. The controller generates an instruction signal for actuating the work implement from the plurality of starting positions.

A second aspect is a method executed by a controller in order to control a work vehicle including a work implement, the method including the following processing. A first processing involves acquiring work range data which indicates a work range. A second processing involves determining a division distance by dividing the entire length of the work range by a predetermined number of divisions. A third processing involves determining a plurality of starting positions so that the distance between each starting position matches the division distance in the work range. A forth processing involves generating an instruction signal for actuating the work implement from the plurality of starting positions.

The third aspect is a control system for a work vehicle including a work implement, the control system comprising a controller. The controller is programmed so as to execute the following processing. The controller acquires work range data which indicates a work range. The controller determines a target design topography which indicates a target locus of the work implement in the work range. At least a portion of the target design topography is positioned below an actual topography. The controller determines a divided soil amount by dividing the total soil amount between the target design topography and the actual topography in the work range, by a predetermined number of divisions. The controller determines a plurality of starting positions so that the soil amount between the target design topography and the actual topography and between each starting position in the work range matches the divided soil amount. The controller generates an instruction signal for actuating the work implement from the plurality of starting positions.

According to the first and second aspects of the present invention, the division distance is determined by dividing the entire length of the work range by a predetermined number of divisions. The plurality of starting positions are determined so that the distance between each starting position matches the division distance in the work range. Therefore, because the distances between the starting positions are equal, the generation of imbalance in the excavated soil amounts can be suppressed with the work from the final starting position in the work range. As a result, a decline in the work efficiency can be suppressed.

According to the third aspect of the present invention, the division soil amounts are determined by dividing the total soil amount between the target design topography and the actual topography in the work range by the predetermined number of divisions. The plurality of starting positions are determined so that the soil amounts between the target design topography and the actual topography and between each starting position in the work range matches the division soil amounts. Therefore, because the soil amounts between each starting position are equal, the occurrence of an imbalance in the excavated soil amounts can be suppressed with the work from the final starting position in the work range. As a result, a decline in the work efficiency can be suppressed.

BRIEF DESCRIPTION OF DRAWINGS

FIG. 7 illustrates an example of division number data according to the first embodiment.

FIG. 10 illustrates an example of division number data according to the second embodiment.

DETAILED DESCRIPTION OF EMBODIMENT(S)

Figure 1:
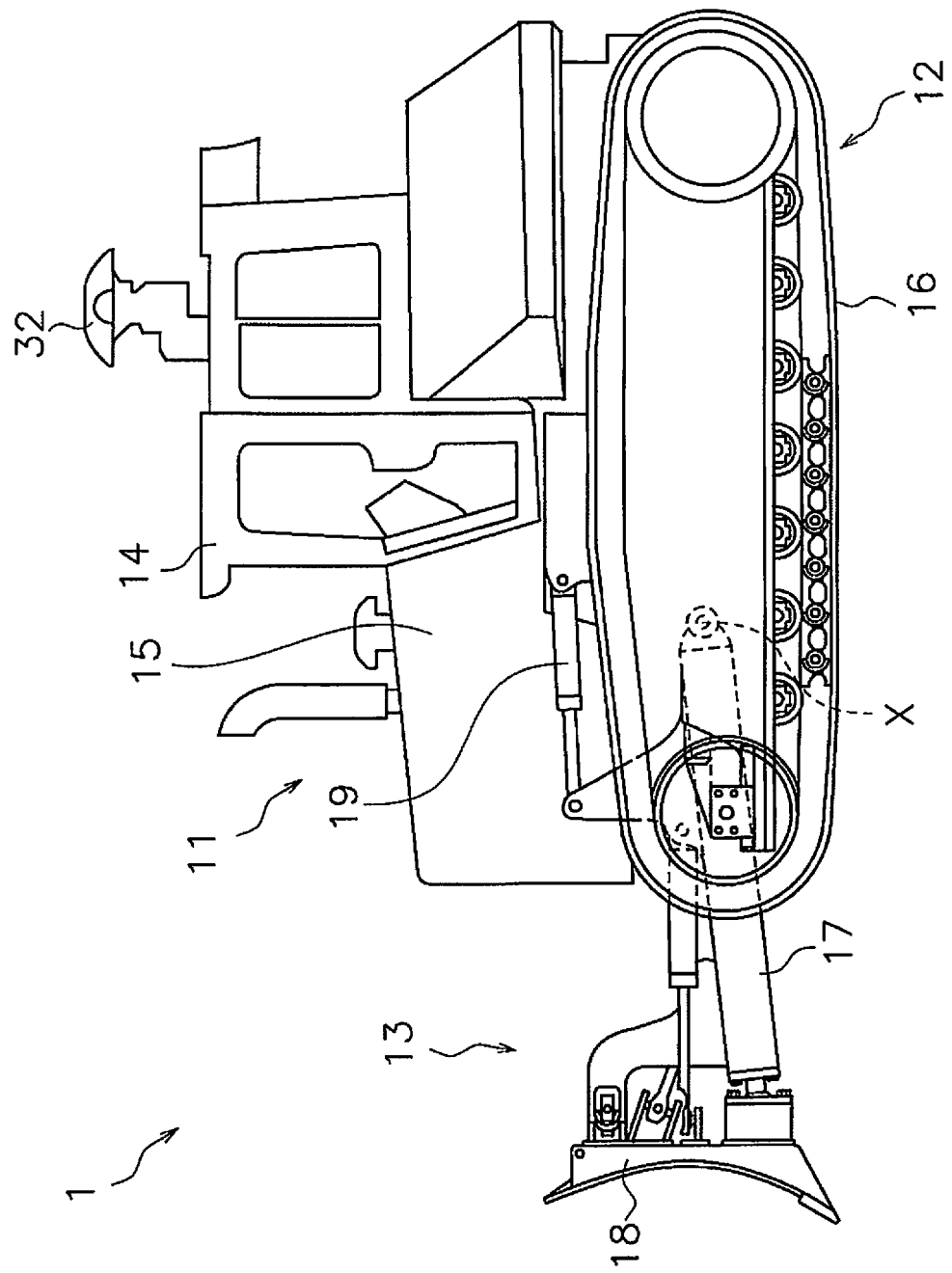
FIG. 1 is a side view of a work vehicle according to an embodiment.

A work vehicle according to an embodiment is discussed hereinbelow with reference to the drawings. FIG. 1 is a side view of a work vehicle 1 according to an embodiment. The work vehicle 1 according to the present embodiment is a bulldozer. The work vehicle 1 includes a vehicle body 11, a travel device 12, and a work implement 13.

The vehicle body 11 includes an operating cabin 14 and an engine compartment 15. An operator's seat that is not illustrated is disposed inside the operating cabin 14. The engine compartment 15 is disposed in front of the operating cabin 14. The travel device 12 is attached to a bottom part of the vehicle body 11. The travel device 12 includes a pair of left and right crawler belts 16. Only the crawler belt 16 on the left side is illustrated in FIG. 1. The work vehicle 1 travels due to the rotation of the crawler belts 16.

The work implement 13 is attached to the vehicle body 11. The work implement 13 includes a lift frame 17, a blade 18, and a lift cylinder 19.

The lift frame 17 is attached to the vehicle body 11 in a manner that allows movement up and down centered on an axis X that extends in the vehicle width direction. The lift frame 17 supports the blade 18. The blade 18 is disposed in front of the vehicle body 11. The blade 18 moves up and down accompanying the up and down movements of the lift frame 17. The lift frame 17 may be attached to the travel device 12.

The lift cylinder 19 is coupled to the vehicle body 11 and the lift frame 17. Due to the extension and contraction of the lift cylinder 19, the lift frame 17 rotates up and down around the axis X.

Figure 2:
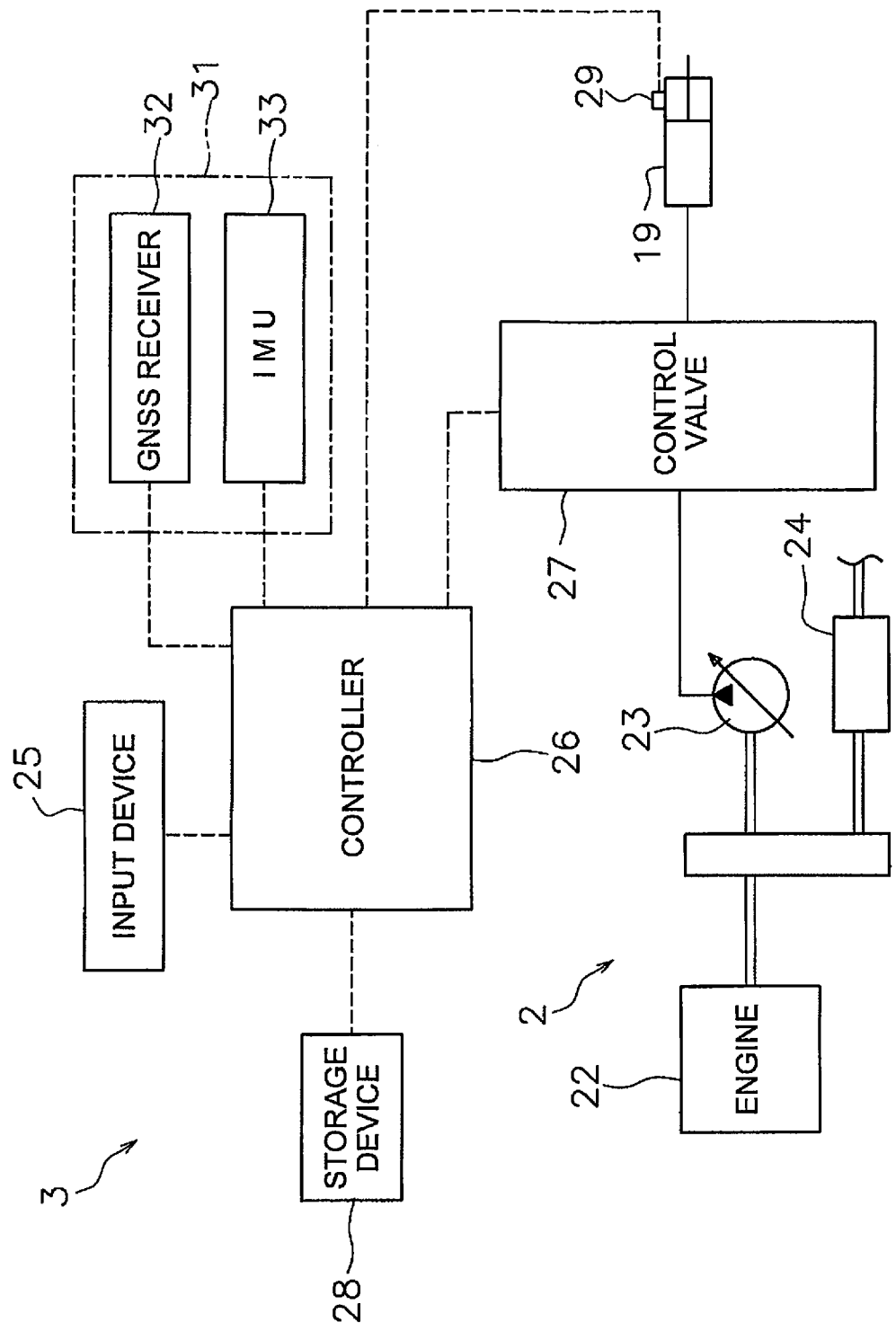
FIG. 2 is a block diagram illustrating a configuration of a drive system and a control system of the work vehicle.

FIG. 2 is a block diagram illustrating a configuration of a drive system 2 and a control system 3 of the work vehicle 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the lift cylinder 19. While only one hydraulic pump 23 is illustrated in FIG. 2, a plurality of hydraulic pumps may be provided.

The power transmission device 24 transmits driving power from the engine 22 to the travel device 12. The power transmission device 24 may be, for example, a hydrostatic transmission (HST). Alternatively, the power transmission device 24 may be, for example, a transmission including a torque converter or a plurality of speed change gears.

The control system 3 includes an input device 25, a controller 26, a storage device 28, and a control valve 27. The input device 25 is disposed in the operating cabin 14. The input device 25 is a device for setting a belowmentioned automatic control of the work vehicle 1. The input device 25 receives an operation from the operator and outputs an operation signal corresponding to the operation. The operation signals of the input device 25 are outputted to the controller 26.

The input device 25 is, for example, a touch panel display. However, the input device 25 is not limited to a touch panel and may include hardware keys. The input device 25 may be disposed in a location (for example, a control center) separated from the work vehicle 1. The operator may operate the work vehicle 1 through wireless communication from the input device 25 in the control center.

The controller 26 is programmed so as to control the work vehicle 1 based on acquired data. The controller 26 includes, for example, a processor such as a CPU. The controller 26 acquires operation signals from the input device 25. The controller 26 is not limited to one component and may be divided into a plurality of controllers. The controller 26 causes the work vehicle 1 to travel by controlling the travel device 12 or the power transmission device 24. The controller 26 causes the blade 18 to move up and down by controlling the control valve 27.

The control valve 27 is a proportional control valve and is controlled with command signals from the controller 26. The control valve 27 is disposed between the hydraulic pump 23 and hydraulic actuators such as the lift cylinder 19. The control valve 27 controls the flow rate of the hydraulic fluid supplied from the hydraulic pump 23 to the lift cylinder 19. The controller 26 generates an instruction signal to the control valve 27 so that the blade 18 is actuated. As a result, the lift cylinder 19 is controlled. The control valve 27 may also be a pressure proportional control valve. Alternatively, the control valve 27 may be an electromagnetic proportional control valve.

Figure 3:
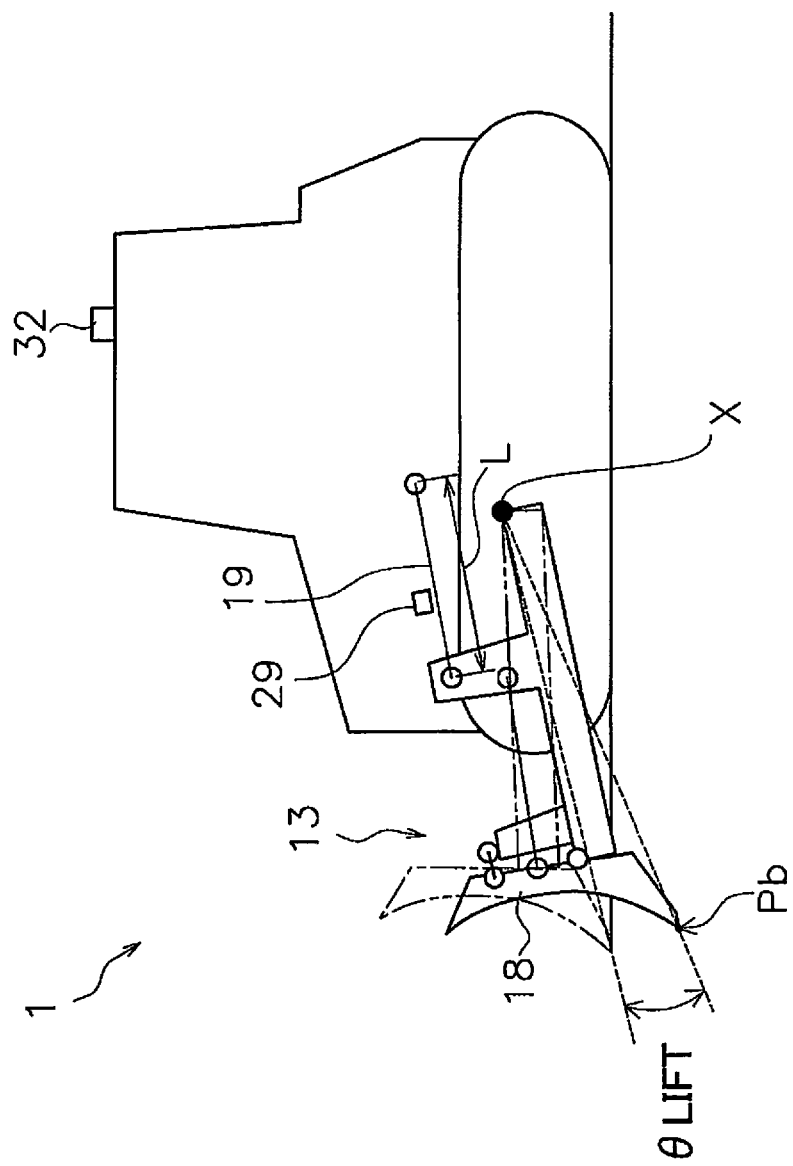
FIG. 3 is a schematic view of a configuration of the work vehicle.

The control system 3 includes a work implement sensor 29. The work implement sensor 29 detects the position of the work implement 13 and outputs a work implement position signal which indicates the position of the work implement 13. The work implement sensor 29 may be a displacement sensor that detects displacement of the work implement 13. Specifically, the work implement sensor 29 detects the stroke length (referred to below as "lift cylinder length L") of the lift cylinder 19. As depicted in FIG. 3, the controller 26 calculates a lift angle θlift of the blade 18 based on the lift cylinder length L. The work implement sensor 29 may also be rotation sensor that directly detects the rotation angle of the work implement 13.

FIG. 3 is a schematic view of a configuration of the work vehicle 1. A reference position of the work implement 13 is depicted as a chain double-dashed line in FIG. 3. The reference position of the work implement 13 is the position of the blade 18 while the blade tip of the blade 18 is in contact with the ground surface on a horizontal ground surface. The lift angle θlift is the angle from the reference position of the work implement 13.

As illustrated in FIG. 2, the control system 3 includes a positional sensor 31. The positional sensor 31 measures the position of the work vehicle 1. The positional sensor 31 includes a global navigation satellite system (GNSS)

receiver 32 and an IMU 33. The GNSS receiver 32 is a receiving apparatus for a global positioning system (GPS), for example. An antenna of the GNSS receiver 32 is disposed on top of the operating cabin 14. The GNSS receiver 32 receives a positioning signal from a satellite, computes the position of the antenna from the positioning signal, and generates vehicle body position data. The controller 26 acquires the vehicle body position data from the GNSS receiver 32. The controller 26 derives the traveling direction and the vehicle speed of the work vehicle 1 from the vehicle body position data.

The vehicle body position data may not be data of the antenna position. The vehicle body position data may be data which indicates the position of any location having a fixed positional relationship with the antenna inside the work vehicle 1 or in the periphery of the work vehicle 1.

The IMU 33 is an inertial measurement device. The IMU 33 acquires vehicle body inclination angle data. The vehicle body inclination angle data includes the angle (pitch angle) relative to horizontal in the vehicle front-back direction and the angle (roll angle) relative to horizontal in the vehicle lateral direction. The controller 26 acquires the vehicle body inclination angle data from the IMU 33.

The controller 26 computes a blade tip position PB from the lift cylinder length L, the vehicle body position data, and the vehicle body inclination angle data. As illustrated in FIG. 3, the controller 26 calculates the global coordinates of the GNSS receiver 32 based on the vehicle body position data. The controller 26 calculates the lift angle θlift based on the lift cylinder length L. The controller 26 calculates the local coordinates of the blade tip position PB with respect to the GNSS receiver 32 based on the lift angle θlift and vehicle body dimension data. The vehicle body dimension data is stored in the storage device 28 and indicates the position of the work implement 13 with respect to the GNSS receiver 32. The controller 26 calculates the global coordinates of the blade tip position PB based on the global coordinates of the GNSS receiver 32, the local coordinates of the blade tip position PB, and the vehicle body inclination angle information. The controller 26 acquires the global coordinates of the blade tip position PB as blade tip position data.

The storage device 28 includes, for example, a memory and an auxiliary storage device. The storage device 28 may be a RAM or a ROM, for example. The storage device 28 may be a semiconductor memory or a hard disk and the like. The storage device 28 is an example of a non-transitory computer-readable recording medium. The storage device 28 records a computer instruction for controlling the work vehicle 1 and that is executable by the processor.

The storage device 28 stores design topography data and work site topography data. The design topography data indicates a final design topography. The final design topography is the final target shape of the outer surface of the work site. The design topography data is, for example, a construction work map in a three-dimensional data format. The work site topography data indicates the topography over a wide area of the work site. The work site topography data is, for example, an actual topography survey map in a three-dimensional data format. The work site topography data maybe acquired, for example, by aeronautical laser surveying.

The controller 26 acquires actual topography data. The actual topography data indicates the actual topography of the work site. The actual topography of the work site is the topography in the traveling direction of the work vehicle 1. The actual topography data is acquired by computing with the controller 26 from the work site topography data, the position of the work vehicle 1 acquired by the abovementioned positional sensor 31, and from the traveling direction. The actual topography data may be acquired by surveying the actual topography by means of on-board laser imaging detection and ranging (LIDAR) or the like.

The controller 26 automatically controls the work implement 13 based on the actual topography data, the design topography data, and the blade tip position data. The automatic control of the work implement 13 may be a semi-automatic control that is performed in accompaniment to manual operations by the operator. Alternatively, the automatic control of the work implement 13 may be a fully automatic control that is performed without manual operations by an operator. The travel of the work vehicle 1 may be performed automatically by the controller 26. For example, the automatic travel of the work vehicle 1 may be a fully automatic control that is performed without manual operations by an operator. Alternatively, the automatic travel may be a semi-automatic control that is performed in accompaniment to manual operations by an operator. Alternatively, the travel of the work vehicle 1 may be performed by manual operations by the operator.

Figure 4:
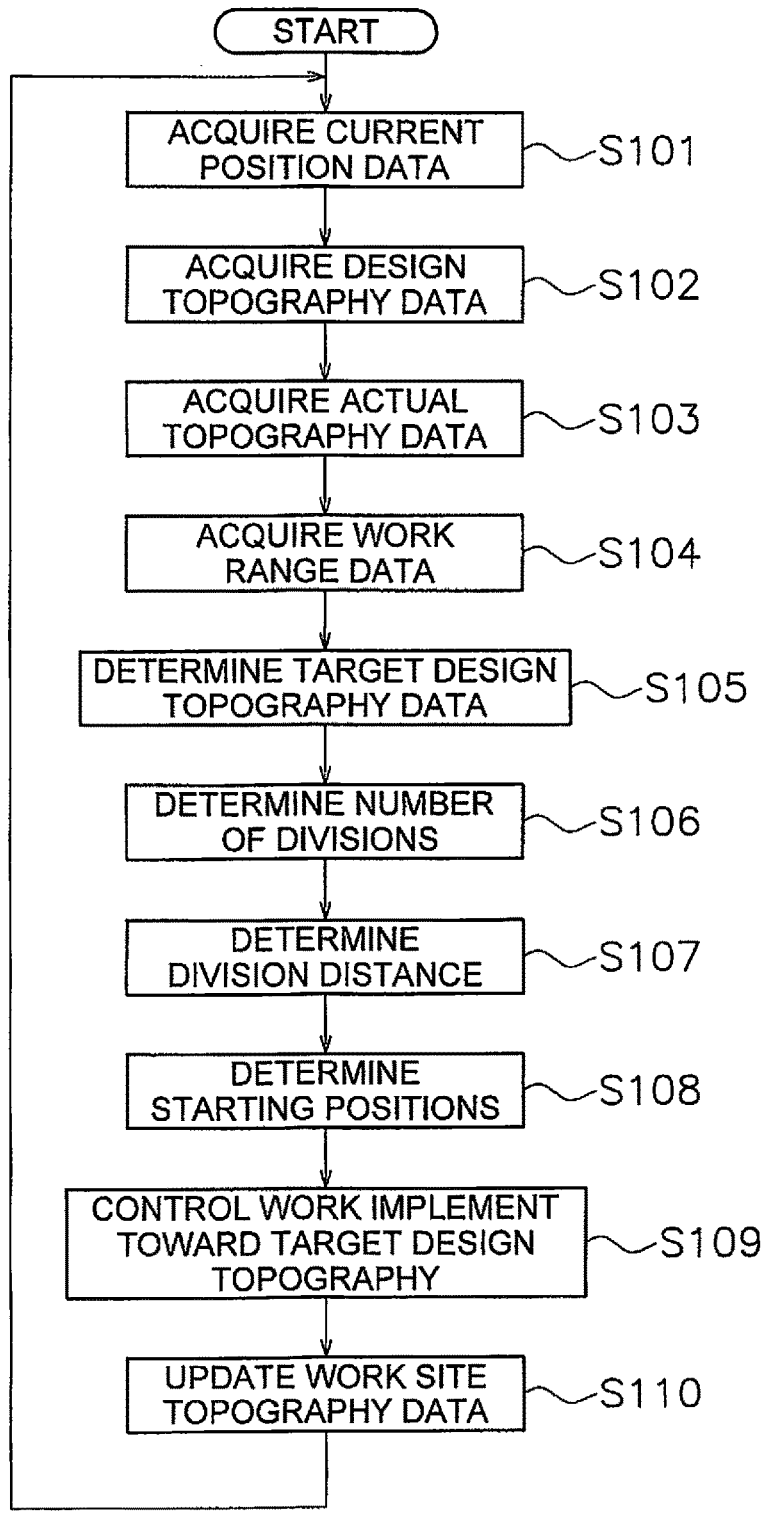
FIG. 4 is a flow chart illustrating automatic control processing of the work vehicle according to a first embodiment.

Automatic control of the work vehicle 1 during excavation work and executed by the controller 26 will be explained below. In the following explanation, the work vehicle 1 moves back and forth in slots during slot dozing to excavate each slot. FIG. 4 is a flow chart illustrating automatic control processing according to the first embodiment.

As illustrated in step S101 in FIG. 4, the controller 26 acquires current position data. The controller 26 acquires the current blade tip position PB of the blade 18 as described above.

Figure 5:
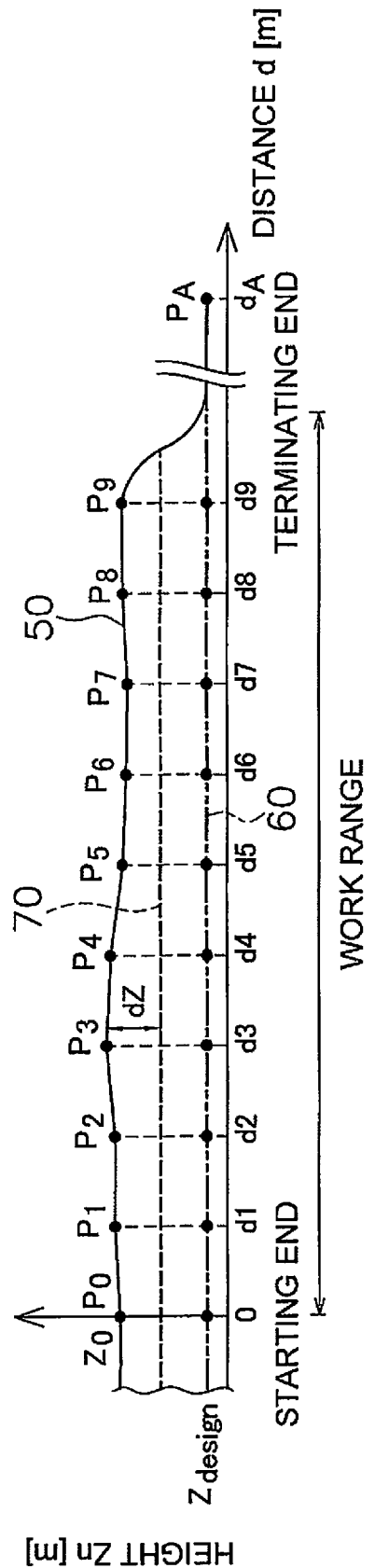
FIG. 5 illustrates examples of a final design topography, an actual topography, and a target design topography.

In step S102, the controller 26 acquires the design topography data. As illustrated in FIG. 5, the design topography data includes a height Zdesign of a final design topography 60 at a plurality of reference points Pn (n=0, 1, 2, 3, ..., A) in the traveling direction of the work vehicle 1. The plurality of reference points Pn indicate a plurality of spots at predetermined intervals in the traveling direction of the work vehicle 1. The plurality of reference points Pn are on the travel path of the blade 18. While the final design topography 60 has a shape that is flat and parallel to the horizontal direction in FIG. 5, the shape of the final design topography 60 may be different.

In step S103, the controller 26 acquires the actual topography data. The controller 26 acquires the actual topography data by computation from the work site topography data from the storage device 28, and from the vehicle body position data and the traveling direction data acquired by the positional sensor 31.

The actual topography data is information which indicates the topography located in the traveling direction of the work vehicle 1. FIG. 5 illustrates a cross-section of an actual topography 50. In FIG. 5, the vertical axis indicates the height of the topography and the horizontal axis indicates the distance from the current position in the traveling direction of the work vehicle 1.

Specifically, the actual topography data includes heights Zn of the actual topography 50 at the plurality of reference points Pn from the current position to a predetermined topography recognition distance dA in the traveling direction of the work vehicle 1. The current position is the position defined based on the current blade tip position PB of the work vehicle 1 in the present embodiment. However, the current position may also be defined based on the current position of another portion of the work vehicle 1. The plurality of reference points are aligned in predetermined intervals of, for example, 1 m.

In step S104, the controller 26 acquires work range data. The work range data indicates the work range set by means of the input device 25. As illustrated in FIG. 5, the work range includes a starting end and a terminating end. The work range data includes the coordinates of the starting end and the coordinates of the terminating end. Alternatively, the work range data may include the coordinates of the starting end and the length of the work range, and the coordinates of the terminating end may be calculated from the coordinates of the starting end and the length of the work range. Alternatively, the work range data may include the coordinates of the terminating end and the length of the work range, and the coordinates of the starting end may be calculated from the coordinates of the terminating end and the length of the work range.

The controller 26 acquires the work range data based on an operation signal from the input device 25. However, the controller 26 may acquire the work range data with another method. For example, the controller 26 may acquire the work range data from an external computer that performs construction management of the work site.

In step S105, the controller 26 determines the target design topography data. The target design topography data indicates a target design topography 70 depicted with a dashed line in FIG. 5. The target design topography 70 indicates the desired locus of the blade tip of the blade 18 during the work. The target design topography 70 is a target profile of the topography that is the work object, and indicates a desired shape as a result of the excavating work.

As illustrated in FIG. 5, the controller 26 determines the target design topography 70 at least a portion of which is located below the actual topography 50. For example, the controller 26 determines the target design topography 70 extending in the horizontal direction. The controller 26 generates the target design topography 70 displaced by a predetermined distance dZ downward from the actual topography 50. The predetermined distance dZ may be set based on an operation signal from the input device 25. The predetermined distance dZ may also be acquired from an external computer that performs construction management of the work site. The predetermined distance dZ may also be a fixed value.

The controller 26 determines the target design topography 70 so as not to go below the final design topography 60. Therefore, the controller 26 determines the target design topography 70 located equal to or above the final design topography 60 and below the actual topography 50 during the excavating work.

Figure 6:
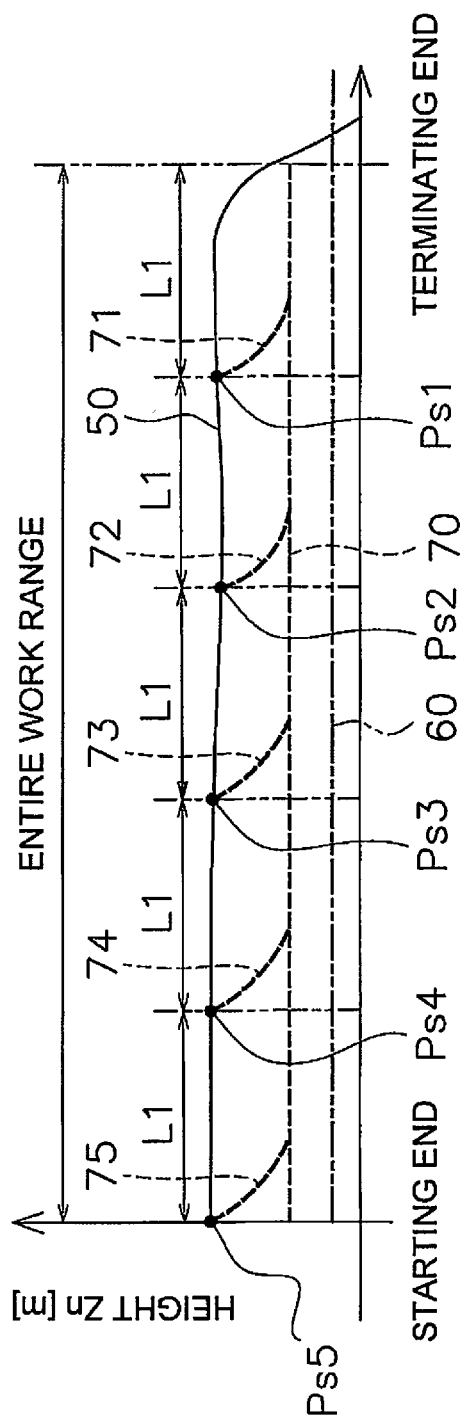
FIG. 6 illustrates an example of starting positions for work according to the first embodiment.

In step S106, the controller 26 determines the number of divisions. As illustrated in FIG. 6, the controller 26 excavates according to the target design topography 70 for each of a plurality of cuts 71-75 in the traveling direction of the work vehicle 1. The number of divisions corresponds to the number of cuts 71-75 set within the work range. The controller 26 determines the number of divisions in response to the entire length of the work range. Specifically, the controller 26 calculates the entire length of the work range from the work range data. The entire length of the work range is the distance between the starting end and the terminating end. The controller 26 determines the number of divisions from the entire length of the work range by referring to division number data.

FIG. 7 illustrates an example of the division number data. The division number data defines the relationship between the entire length of the work range and the number of divisions. The division number data is, for example, a table as illustrated in FIG. 7. However, the division number data may be represented by another format such as a formula or a map. In the division number data, the number of divisions increases in response to an increase in the entire length of the work range. The division number data is saved in the storage device 28. The division number data can be modified in response to an operation of the input device 25 by the operator. The numerical values depicted in FIG. 7 are examples and are not limited to the numbers depicted therein.

In step S107, the controller 26 determines a division distance L1. As illustrated in FIG. 6, the controller 26 determines a value derived by dividing the entire length of the work range by the number of divisions, as the division distance L1. The division distance L1 is the distance between each of the starting positions Ps1-Ps5 for the work of the cuts 71-75. In the example in FIG. 6, the controller 26 determines the number of divisions to be "5," and determines the value derived by dividing the entire length of the work range by "5" as the division distance L1.

In step S108, the controller 26 determines the starting positions of the work. The controller 26 determines the starting positions Ps1-Ps5, and determines the working order thereof, for the work of the cuts 71-75 within the work range in the target design topography 70. The controller 26 determines positions separated from each other by the division distance L1 from the terminating end, as the starting positions Ps1-Ps5.

Specifically, the controller 26 determines the position separated by the division distance L1 from the position of the terminating end toward the starting end in the work range, as the first starting position Ps1. The controller 26 determines the position separated by the division distance L1 from the first starting position Ps1 toward the starting end as the second starting position Ps2. The controller 26 determines the position separated by the division distance L1 from the second starting position Ps2 toward the starting end as the third starting position Ps3. The controller 26 performs the same determination for the other cuts and determines the plurality of starting positions Ps1-Ps5 within the work range. The controller 26 then determines the working order among the plurality of starting positions Ps1-Ps5 so that excavating is performed in order from the position closest to the terminating end.

In step S109, the controller 26 controls the blade 18 toward the target design topography 70. The controller 26 starts the work by the work implement 13 from the starting positions Ps1-Ps5 determined in step S108, and generates instruction signals to the work implement 13 so that the blade tip position of the blade 18 moves along the target design topography 70 created in step S105. The generated instruction signals are inputted to the control valve 27. Consequently, the blade tip position PB of the blade 18 moves from each of the starting positions Ps1-Ps5 toward the target design topography 70.

When the excavation of one cut 71 from the first starting position Ps1 is completed, the controller 26 moves the work vehicle 1 to the second starting position Ps2 and excavates the next cut 72. When the excavation of the cut 72 is completed, the controller 26 moves the work vehicle 1 to the third starting position Ps3 and excavates the next cut 73. By repeating the aforementioned work, the excavation of one target design topography 70 within the work range is completed.

When the excavation of one target design topography 70 within the work range is completed, the controller 26 determines the starting positions of work for each cut and the working order thereof for the next target design topography 70 that is located further below, and then starts the excavation of the cuts. By repeating the aforementioned processing, the excavation is performed so that the actual topography 50 approaches the final design topography 60.

In step S110, the controller 26 updates the work site topography data. The controller 26 updates the work site topography data with position data which indicates the most recent locus of the blade tip position PB. The updating of the work site topography data may be performed occasionally. Alternatively, the controller 26 may calculate the position of the bottom surface of the crawler belts 16 from the vehicle body position data and the vehicle body dimension data and update the work site topography data with the position data that indicates the locus of the bottom surface of the crawler belts 16. In this case, the updating of the work site topography data can be performed immediately.

Alternatively, the work site topography data may be generated from survey data measured by a survey device outside of the work vehicle 1. For example, aeronautical laser surveying may be used as the external measurement device. Alternatively, the actual topography 50 may be imaged by a camera and the work site topography data may be generated from image data captured by the camera. For example, aerial photography surveying performed with an unmanned aerial vehicle (UAV) may be used. In the case of an external surveying device or camera, the updating of the work site topography data may be performed at a predetermined frequency or occasionally.

As explained above, a value derived by equally dividing the entire length of the work range by a predetermined number of divisions is determined as the division distance L1 in the first embodiment. The plurality of starting positions are then determined so that the distance between each starting position matches the division distance L1 within the work range. That is, the starting positions are determined so that the intervals between each starting position are equal in the work range. As a result, the generation of an imbalance in the soil amounts with the work from the final starting position within the work range is suppressed. Consequently, a decline in the work efficiency can be limited.

Figure 8:
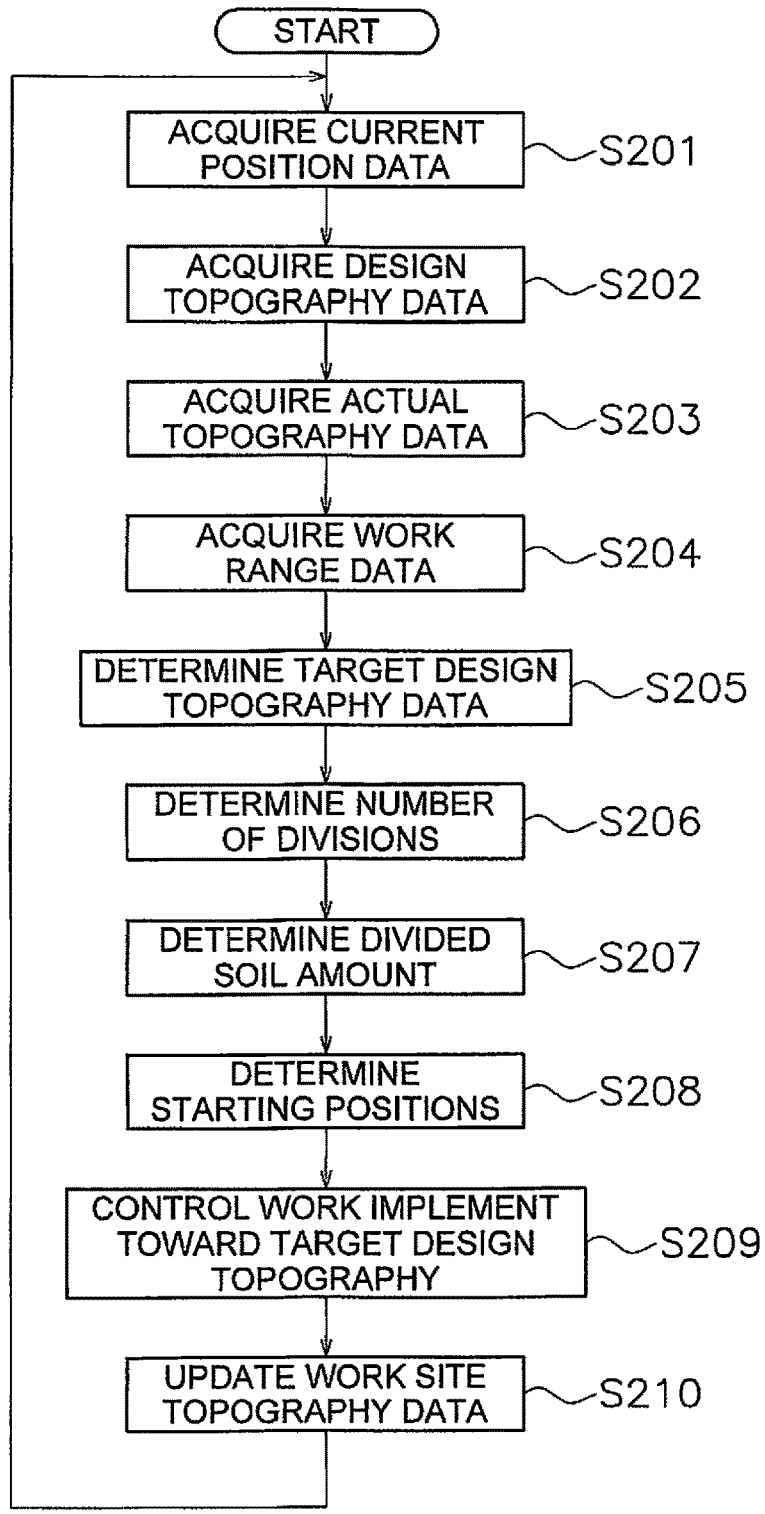
FIG. 8 is a flow chart illustrating automatic control processing of the work vehicle according to a second embodiment.

The following is an explanation of the automatic control according to a second embodiment. FIG. 8 is a flow chart illustrating automatic control processing according to a second embodiment. The steps S201 to S205 in FIG. 8 are respectively the same as steps S101 to S105 in the first embodiment illustrated in FIG. 4.

In step S206, the controller 26 determines the number of divisions. The controller 26 calculates the total soil amount between the target design topography 70 and the actual topography 50 within the work range. The total of the hatched portions in FIG. 9 indicates the total soil amount. The soil amounts may be calculated as a predetermined fixed value with respect to the size of the topography in the vehicle width direction of the work vehicle 1. For example, the controller 26 may calculate the soil amounts by multiplying the width of the blade 18 by the surface area of the hatched cross-sections in FIG. 9. The controller 26 refers to the division number data, thereby determining the number of divisions from the total soil amount.

FIG. 10 illustrates an example of the division number data according to the second embodiment. The division number data defines a relationship between the total soil amount between the target design topography 70 and the actual topography 50 and the number of divisions within the work range. As illustrated in FIG. 10, the division number data is, for example, a table. However, the division number data may be represented by another format such as a formula or a map. In the division number data, the number of divisions increases as the total soil amount increases. The division number data is saved in the storage device 28. The division number data can be modified in response to an operation of the input device 25 by the operator. The numerical values depicted in FIG. 10 are examples and are not limited to these values.

In step S207, the controller 26 determines a divided soil amount. The controller 26 determines a value derived by dividing the total soil amount by the number of divisions as a divided soil amount S1.

In step S208, the controller 26 determines starting positions for working. The controller 26 determines starting positions Ps1-Ps5 for working, and the working order thereof, for cuts 71-75 within the work range in the target design topography 70. The controller 26 determines the plurality of starting positions Ps1-Ps5 so that each soil amount between the target design topography 70 and the actual topography 50 and between the starting positions Ps1-Ps5 matches the divided soil amount S1 in the work range.

Figure 9:
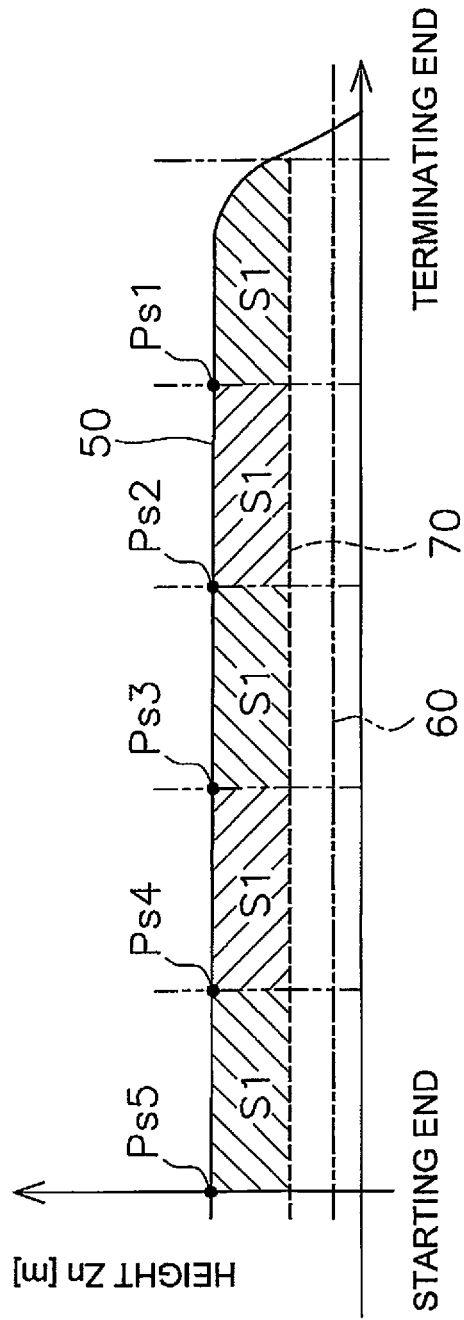
FIG. 9 illustrates an example of starting positions for work according to the second embodiment.

Specifically, as illustrated in FIG. 9, the controller 26 sets a position spaced away from the position of the terminating end toward the starting end within the work range as the first starting position Ps1, and determines the first starting position Ps1 so that the soil amount between the terminating end and the first starting position Ps1 and between the target design topography 70 and the actual topography 50, matches the divided soil amount S1. The controller 26 sets a position spaced away from the first starting position Ps1 toward the starting end as the second starting position Ps2, and determines the second starting position Ps2 so that the soil amount between the first starting position Ps1 and the second starting position Ps2 and between the target design topography 70 and the actual topography 50, matches the divided soil amount S1. The controller 26 performs the same determination for the other cuts and determines the plurality of starting positions Ps1-Ps5 within the work range. The controller 26 then determines the working order among the plurality of starting positions Ps1-Ps5 so that excavating is performed in order from the position closest to the terminating end.

Steps S209 and S210 are respectively the same as steps S109 and S110 of the first embodiment illustrated in FIG. 4.

As explained above, a value derived by dividing the total soil amount between the target design topography 70 and the actual topography 50 within the work range, by the predetermined number of divisions is determined as the divided soil amount S1 in the second embodiment. Moreover, the number of starting positions is determined so that the soil amounts between the target design topography 70 and the actual topography 50 and between each starting position within the work range match the divided soil amount S1. That is, the plurality of starting positions are determined so that the soil amounts between the target design topography 70 and the actual topography 50 and between each starting position within the work range are equal. As a result, the generation of an imbalance in the soil amounts with the work from the final starting position within the work range is suppressed. As a result, a decline in the work efficiency can be suppressed.

Although embodiments of the present invention have been described so far, the present invention is not limited to the above embodiments and various modifications may be made within the scope of the invention.

The work vehicle 1 is not limited to a bulldozer, and may be another type of work vehicle such as a wheel loader or a motor grader and the like.

The work vehicle 1 may be a vehicle that can be remotely operated. In this case, a portion of the control system 3 may be disposed outside of the work vehicle 1. For example, the controller 26 may be disposed outside the work vehicle 1. The controller 26 may be disposed inside a control center separated from the work site. In this case, the work vehicle 1 may be a vehicle without the operating cabin 14.

The work vehicle 1 may be a vehicle driven by an electric motor. In this case, a portion of the power source may be disposed outside of the work vehicle 1. The work vehicle with which the power source is supplied from outside may be a vehicle without an internal combustion engine or an engine compartment.

Figure 11:
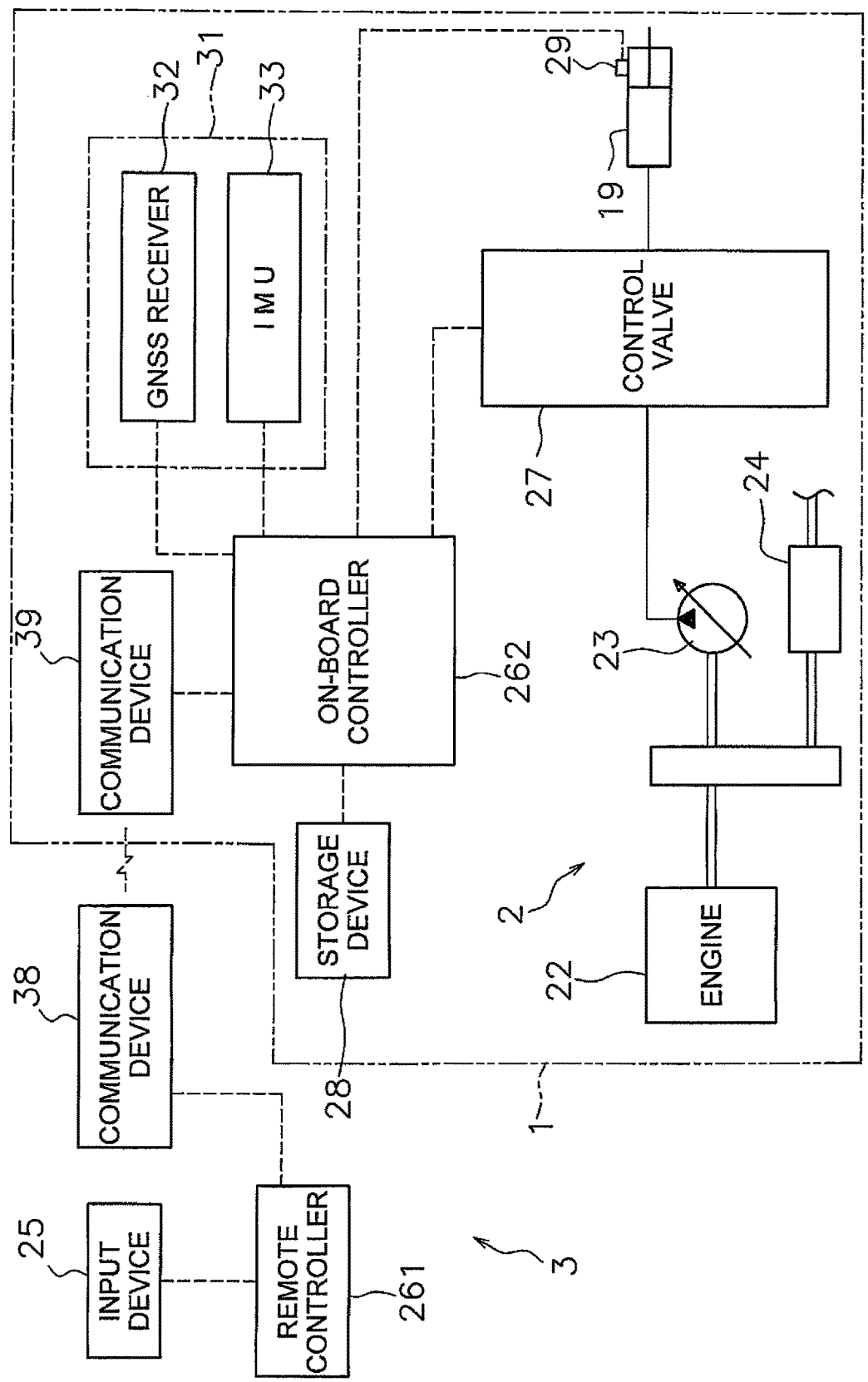
FIG. 11 is a block diagram of a configuration according to a first modified example of the control system.

The controller 26 may have a plurality of controllers 26 separate from each other. For example as illustrated in FIG. 11, the controller 26 may include a remote controller 261 disposed outside of the work vehicle 1 and an on-board controller 262 mounted on the work vehicle 1. The remote controller 261 and the on-board controller 262 may be able to communicate wirelessly via communication devices 38 and 39. A portion of the abovementioned functions of the controller 26 may be executed by the remote controller 261, and the remaining functions may be executed by the on-board controller 262. For example, the processing for determining the target design topography 70 and the working order may be performed by the remote controller 261, and the process for outputting the instruction signals to the work implement 13 may be performed by the on-board controller 262.

The input device 25 may also be disposed outside of the work vehicle 1. In this case, the operating cabin may be omitted from the work vehicle 1. Alternatively, the input device 25 may be omitted from the work vehicle 1. The input device 25 may include operating pieces such as an operating lever, a pedal, or a switch for operating the travel device 12 and/or the work implement 13. The forward and reverse travel of the work vehicle 1 may be controlled in response to the operation of the input device 25. Actions such as the raising and lowering of the work implement 13 may be controlled in response to the operation of the input device 25.

Figure 12:
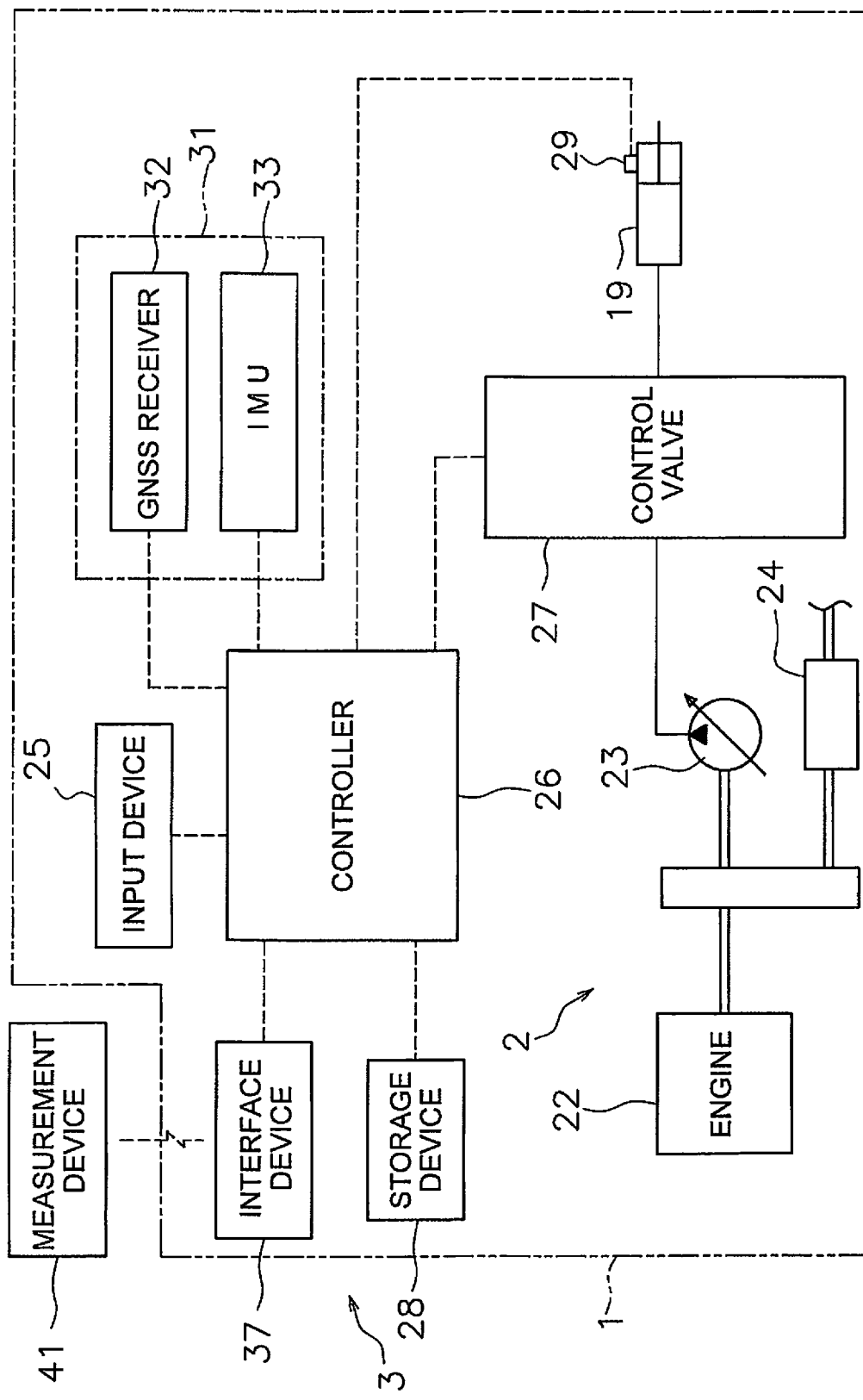
FIG. 12 is a block diagram of a configuration according to a second modified example of the control system.

The actual topography 50 may be acquired with another device and is not limited to being acquired with the abovementioned positional sensor 31. For example, as illustrated in FIG. 12, the actual topography 50 may be acquired with an interface device 37 that receives data from an external device. The interface device 37 may wirelessly receive actual topography data measured by an external measurement device 41. Alternatively, the interface device 37 may be a recording medium reading device and may receive the actual topography data measured by the external measurement device 41 via a recording medium.

Figure 13:
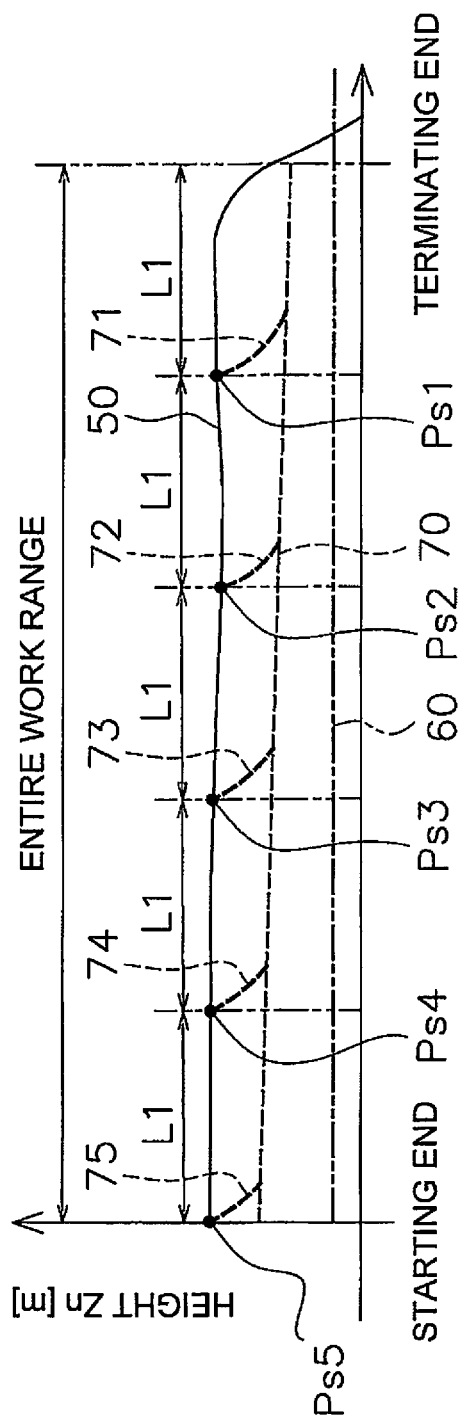
FIG. 13 illustrates a modified example of the target design topography.

The method for setting the target design topography 70 is not limited to the method of the above embodiment and may be changed. For example, the target design topography 70 may be one in which the actual topography 50 is displaced by a predetermined distance in the vertical direction. Alternatively, as illustrated in FIG. 13, the target design topography 70 may be sloped at a predetermined angle with respect to the horizontal direction. The predetermined angle may be set by the operator. Alternatively, the controller 26 may automatically determine the predetermined angle. The controller 26 may also set the target design topography 70 to a position higher than the final design topography Zdesign by a predetermined distance dZ.

Figure 14:
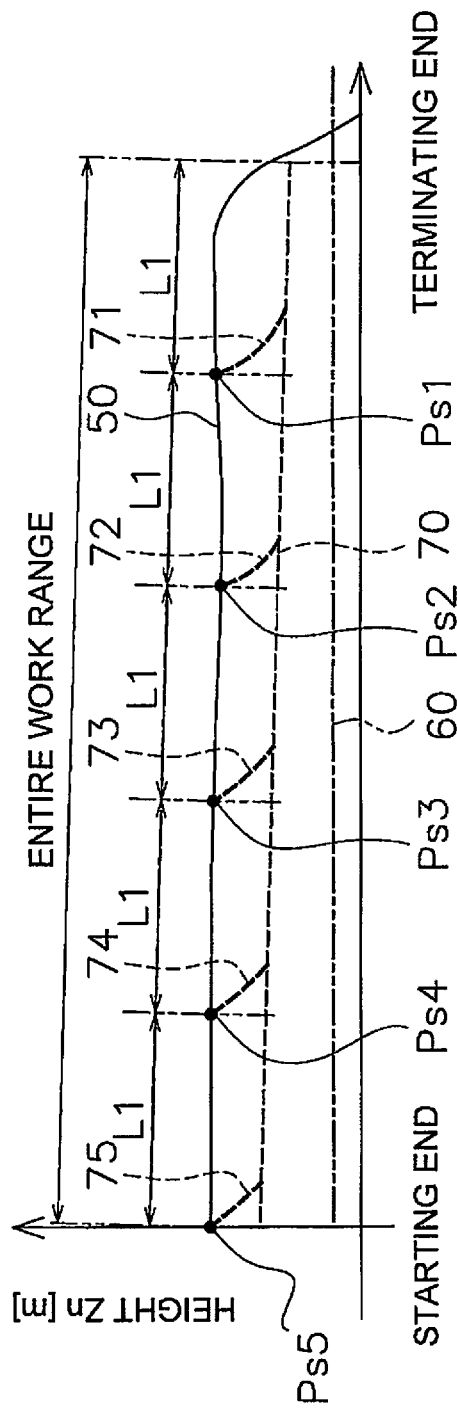
FIG. 14 illustrates a modified example of the entire length of the work range and the division distance.

In the first embodiment, the entire length of the work range and the division distance L1 are distances in the horizontal direction. However, when the target design topography 70 is sloped as explained above, the entire length of the work range and the division distance L1 may be distances in a direction parallel to the target design topography 70 as illustrated in FIG. 14.

When the target design topography 70 is sloped, the controller 26 may determine the number of divisions so that the division distances L1 are changed in response to the inclination angle. When the target design topography 70 is sloped upward, the controller 26 may determine the number of divisions so that the division distances L1 become smaller in comparison to when the target design topography 70 is horizontal. When the target design topography 70 is sloped downward, the controller 26 may determine the number of divisions so that the division distances L1 become larger in comparison to when the target design topography 70 is horizontal.

The controller 26 may determine the number of divisions in response to a capability parameter which indicates a mechanical capability of the work vehicle 1. The capability parameter may be, for example, the rated output or the vehicle weight of the work vehicle, or the capability of the blade 18. The capability parameter may be saved in the storage device 28. The controller 26 may read the capability parameter from the storage device 28, thereby acquiring the capability parameter. The controller 26 may increase the number of divisions in response to an increase in the capability parameter. The controller 26 may determine the number of divisions by multiplying the number of divisions determined from the aforementioned division number data by a predetermined coefficient. The controller 26 may determine the coefficient in response to the aforementioned capability parameter.

The controller 26 may divide the entire length of the work range by an effective excavation distance and may determine the smallest substantial integer solution as the number of divisions. The effective excavation distance may be set by the operator.

The controller 26 may determine positions spaced away from each other by the division distance L1 from the terminating end, as finishing positions Ps1-Ps5. The controller 26 may generate instructions signals to the work implement 13 so that the blade tip position of the blade 18 is moved along the target design topography 70 and finishes the work at each of the plurality of finishing positions Ps1-Ps5.

According to the present invention, a decline in the work efficiency can be suppressed during the automatic control of the work vehicle.

What is claimed is:

1. A control system for a work vehicle including a work implement, the control system comprising:
a controller configured to
acquire work range data indicative of a work range;
determine a division distance by dividing an entire length of the work range by a predetermined number of divisions;
determine a plurality of starting positions so that a distance between each starting position matches the division distance in the work range, the plurality of starting positions including a first starting position and a second starting position disposed farther rearward with respect to a vehicle traveling direction than the first starting position; and generate an instruction signal to actuate the work implement successively from each of the plurality of starting positions in the traveling direction such that the work implement is actuated from the first starting position and, after completing work from the first starting position, the work vehicle is moved to the second starting position and the work implement is actuated from the second starting position.

2. The control system for the work vehicle according to claim 1, wherein
the controller is further configured to determine the predetermined number of divisions in response to the entire length of the work range.

3. The control system for the work vehicle according to claim 1, wherein
the controller is further configured to
acquire a capability parameter indicative of a mechanical capability of the work vehicle, and
determine the predetermined number of divisions based on the capability parameter.

4. The control system for the work vehicle according to claim 1, wherein
the work range includes a terminating end, and
the controller is further configured to determine positions spaced away from the terminating end by increments of the division distance as the plurality of starting positions in the work range.

5. A method executed by a controller for controlling a work vehicle including a work implement, the method comprising:
acquiring work range data indicative of a work range;
determining a division distance by dividing an entire length of the work range by a predetermined number of divisions;
determining a plurality of starting positions so that a distance between each starting position matches the division distance in the work range, the plurality of starting positions including a first starting position and a second starting position disposed farther rearward with respect to a vehicle traveling direction than the first starting position; and
generating an instruction signal to actuate the work implement successively from each of the plurality of starting positions in the traveling direction such that the work implement is actuated from the first starting position and, after completing work from the first starting position, the work vehicle is moved to the second starting position and the work implement is actuated from the second starting position.

6. The method according to claim 5, further comprising determining the predetermined number of divisions in response to the entire length of the work range.

7. The method according to claim 5, further comprising, acquiring a capability parameter indicative of a mechanical capability of the work vehicle, and
determining the predetermined number of divisions based on the capability parameter.

8. The method according to claim 5, wherein
the work range includes a terminating end, and
the determining of the plurality of starting position includes determining positions spaced away from the terminating end by increments of the division distance as the plurality of starting positions in the work range.

9. A control system for a work vehicle including a work implement, the control system comprising:
a controller configured to
acquire work range data indicative of a work range;
determine a target design topography indicative of a target locus of the work implement, at least a portion of the target design topography being positioned below an actual topography in the work range,
determine a divided soil amount by dividing a total soil amount by a predetermined number of divisions, the total soil amount being between the target design topography and the actual topography within the work range,
determine a plurality of starting positions so that soil amounts between each of the starting positions and between the target design topography and the actual topography match the divided soil amount in the work range, and
generate an instruction signal to actuate the work implement from the plurality of starting positions.

10. The control system for the work vehicle according to claim 9, wherein
the controller is further configured to determine the predetermined number of divisions in response to the total soil amount.

11. The control system for the work vehicle according to claim 9, wherein
the controller is further configured to
acquire a capability parameter indicative of a mechanical capability of the work vehicle, and
determine the predetermined number of divisions in response to the capability parameter.

12. The control system for the work vehicle according to claim 9, wherein
the work range includes a terminating end, and
the controller is further configured to determine positions spaced away from the terminating end by increments of the divided soil amount as the plurality of starting positions within the work range.

* * * * *